United States Patent [19]

Doan et al.

[11] Patent Number: 4,967,203

[45] Date of Patent: Oct. 30, 1990

[54] INTERLACE PRINTING PROCESS

[75] Inventors: Alpha N. Doan, San Diego; Anthony D. Parkhurst, Oceanside, both of Calif.

[73] Assignee: Hewlett-Packard Company, Palo Alto, Calif.

[21] Appl. No.: 414,831

[22] Filed: Sep. 29, 1989

[51] Int. Cl.$^5$ ................................................ B41J 2/21
[52] U.S. Cl. ................................ 346/1.1; 346/140 R; 358/75
[58] Field of Search ................ 346/140, 1.1; 358/298, 358/75

[56] References Cited

U.S. PATENT DOCUMENTS

| | | | |
|---|---|---|---|
| 4,367,482 | 1/1983 | Heinzl | 346/140 |
| 4,593,295 | 6/1986 | Matsufuji | 346/140 |
| 4,680,596 | 7/1987 | Logan | 346/140 |
| 4,748,453 | 5/1988 | Lin | 346/1.1 |
| 4,809,063 | 2/1989 | Moriguchi | 346/75 |
| 4,855,752 | 8/1989 | Bergstedt | 346/1.1 |
| 4,894,665 | 1/1990 | Davis | 346/1.1 |

FOREIGN PATENT DOCUMENTS

| | | |
|---|---|---|
| 113571 | 9/1980 | Japan . |
| 113573 | 9/1980 | Japan . |
| 181652 | 8/1986 | Japan . |

Primary Examiner—Joseph W. Hartary

[57] ABSTRACT

Quality of printed images as produced by an ink-jet printer (10) is improved by staggering applications of ink dots (30) to pixel locations (36) such that overlapping ink dots are printed on successive passes of a printhead (16) and such that swaths (38) are partially printed on overlapping passes of the printhead. Quality of multi-colored or multi-shaded images is further improved by grouping pixels (36) into super pixels (42), and applying various combinations of colored ink dots to the various pixels within each super pixel in a staggered sequence.

16 Claims, 3 Drawing Sheets

INTERLACE PRINTING PROCESS

TECHNICAL FIELD

The present invention relates to liquid ink-jet printers and, more particularly, to a pattern and sequence for depositing ink on a print medium so as to improve the appearance of printed images.

BACKGROUND OF THE INVENTION

Dot matrix printing is the general term for the production of a printed image upon a print medium accomplished by means of the depositing of a plurality of small individual spots or "dots" of ink upon the medium which, when viewed together, closely approximate the desired image. This general method is commonly used in the production of a variety of printed images and illustrations. It is effective because the printed dots can be made to be closer to or further away from each other to produce more or less darkly shaded areas as desired. Further, the phenomena of human perception tend to cause viewers to perceive the overall image that is intended, in spite of minor irregularities. Within the limits imposed by the relative size of the smallest portions of the image to be imprinted (the "detail") to the size of the dots used, such irregularities are perceived only as a reduction of the quality of the image presented.

The impact dot matrix printer, wherein images are produced using a typewriter style inked ribbon and a plurality of wire "hammers" which impact the ribbon, thus causing the ribbon to deposit ink upon the medium, embodied the first large scale application of this principle in the field of computer hardcopy output. A later development has been the ink-jet printer. Ink-jet printers utilize the same dot matrix concept as do impact dot matrix printers. However, instead of depositing ink upon the medium by means of a hammer impacting an ink impregnated ribbon, ink-jet printers eject droplets of ink from a printhead onto the print medium. Each droplet, upon striking the medium, forms a small dot.

Ink-jet printers have several advantages over impact printers in that they can be made to operate more quietly, faster, and more reliably (since there are far fewer moving parts). Also, ink-jet printers are more readily adaptable to applications requiring multi-colored print images, since they can easily be designed to incorporate nozzles or sets of nozzles for more than a single color of ink. In fact, it has become common to utilize four sets of nozzles in such applications, for the colors of cyan, magenta, yellow, and black. Cyan, magenta, and yellow are referred to as the subtractive primary colors. Additional color combinations can be produced by causing the printer to deposit multiple dots of different colored inks in the same locations, thus effecting a perceived mixing of the colors to form what are known as secondary colors.

While it is theoretically possible to produce a multitude of different colors and shades of colors by overlaying three or more droplets of ink on each individual potential dot location ("pixel"), practical limitations such as the ability of the medium to readily absorb the liquid ink carrier, the available drying time between successive depositing of droplets, and the fact that the semi-opaque character of dried ink droplets results in a diminishing effect for each successively applied droplet have resulted in a practical limitation of a maximum of two droplets per pixel in most applications. Thus, using the above described scheme, a maximum of eight colors are available per pixel, these being:
  white (no ink deposited),
  black,
  yellow,
  cyan,
  magenta,
  red (magenta and yellow),
  green (yellow and cyan), and
  blue (cyan and magenta).

Obviously, a scheme for producing a multitude of different colors and shades (lighter and darker variations of colors), without violating the practical limitation of a maximum of two droplets of ink per pixel, is desirable. However, methods for doing this that have been developed have proven to be less than totally satisfactory since they have either not included provision for a drying interval between applications of ink to contiguous pixel locations or groups of pixel locations, or they have not addressed the problem of color banding. Further, prior art methods have not provided a rational pattern for laying down the various inks wherein optimal image quality may be obtained.

A number of means for causing the ink to expel from the printhead in ink-jet printers have been tried with varying degrees of success. These include electrostatic means (wherein the ink is either repelled or accelerated by means of electrostatic repulsion or attraction), and thermal means (wherein an individual droplet of ink is rapidly heated and vaporized and is effectively boiled out of a nozzle). Since the present invention pertains to the allocation and sequence of application of inks to pixel locations of a print medium, it is equally applicable to any of these various methods for physically depositing ink within the pixels.

An ink-jet printer must also include a mechanism for positioning an ink-jet nozzle in a proper location over the print medium and for then causing the nozzle to deposit ink upon the medium at that location. This is generally accomplished, under computer control, by providing a means for moving the medium, by regular increments, past a printhead location. After each such incremental advancement of the medium, a printhead containing one or more ink nozzles is moved across the medium in a direction perpendicular to the direction of the advancement of the medium. At each of a plurality of incremental positions along this perpendicular printhead path, each of the nozzles contained therein is caused by the computer to either eject an ink droplet or to refrain from doing so. By repeating this process, every potential pixel location on the medium may be addressed.

Due to the extremely small sizes of the ink nozzles utilized, a plurality of such nozzles may be contained on a printhead. Further, since it is desirable to reduce the number of perpendicular traversals of the printhead across the medium, it is desirable to include as many nozzles in the printhead as is practical. It is also desirable, in order to obtain complete coverage of the medium, to have overlapping coverage of ink dots, as depicted in FIG. 6. Therefore, it is not practical to have all nozzles contained within a single column. This does not present a problem, however, since the nozzles may be staggered as shown in FIG. 7. When the printhead is being moved in the direction shown by the arrow, a desired print pattern such as that shown in FIG. 8 may be created under computer/processor control by staggering the timing of the firing of nozzles as they pass over the medium. That area of the medium which may be imprinted with a single pass of the printhead is referred to as a swath.

The above described arrangement of nozzles is applicable for each of the several colors of ink which may be employed in a color printer. Columns of nozzles for each color may be arranged in any of several different manners including parallel to each other on a common printhead, parallel to each other on individual printheads, or consecutively on either a common or individual printheads.

While any of these physical arrangements of nozzles is workable, as are many other potential arrangements, they also each present potential pitfalls to the goal of creating high quality multi-colored or multi-shaded images. First, as discussed previously, if multiple colors are to be derived from the four colors of ink used (including black), with the limitation that a maximum of two colors may be applied per pixel, only eight colors (including black and white) can be produced. This is far less than a desirable full spectrum of colors and shadings. Further, problems associated with all ink-jet printers, such as "bleeding" of ink from one pixel into another, are compounded when multiple colors or shadings are desired because when more ink is used, bleeding and other migrations of wet ink are more likely to occur, and because inadvertent intermixing of colors or shadings may produce a particularly objectionable product.

"Bleeding" of ink from one pixel into another is most likely to occur when the ink in both pixels is simultaneously wet. The surface tensions of two contiguous droplets of ink may yield to a combined tension encompassing both droplets, thus allowing the ink to flow between the pixels whereon these droplets are located. Various schemes have been utilized to provide a drying time between applications of ink to contiguous pixel locations. U.S. Pat. No. 4,748,453 issued to Lin et al. teaches an example of one of these application methods. The Lin patent describes a method wherein only half of the pixels in a swath are printed at one pass of a printhead. The printhead is then moved over the same area again, with the other half of the pixels in the swath being printed on that second pass. This method reduces the number of simultaneously wet contiguous pixels somewhat, but it does not increase the number of colors or shadings available, and it does not address the additional problem of "banding".

Banding is a series of noticeable belts or bands across the print medium. These are commonly caused by mechanical misalignment of printer parts such as step error, drop volume variations, or nozzle directionality. Step error is the overshoot or undershoot of the medium as it is advanced. For example, if a printer is designed to advance the medium 0.167 inch after each swath is printed, but because of variances in part and/or assembly tolerances it actually advances 0.170 inch, there would be a 0.003 inch step error. This means that there would be a 0.003 inch unprinted band across the paper between each swath. Drop volume variations may be caused by tolerance variations in nozzle sizes or other irregularities. Nozzle directionality refers to variations in the precise angles at which ink droplets are ejected from the various nozzles. Any of these irregularities can cause a banding problem. The combined method of the present invention teaches a way to avoid this problem.

Therefore, while methods have been developed to reduce unwanted migration of inks between contiguous pixel locations, to the inventors' knowledge, no prior art method has provided a way to reduce migration while also eliminating the "banding" problem. Furthermore, no prior art method for producing multi-colored or multi-shaded images has provided a way to prevent banding while reducing unwanted ink migration.

DISCLOSURE OF INVENTION

The present invention relates to the printing of images upon a print medium using an ink-jet printer. A method including a pattern and a sequence for depositing droplets of ink upon the medium is disclosed which provides a means for greatly reducing unwanted bleeding of colors between contiguous pixel locations or groups of pixel locations and also provides a means for greatly reducing printer banding problems. The inventive method further provides a pattern and sequence wherein a great number of variations of coloring and shading may be produced in multi-colored printed images, or a great variety of shadings may be produced in single colored (monochrome) images while retaining the advantages of reduction of unwanted ink migration and reduction of banding. A variation of the method of the present invention involves the formation of "super pixels", with each such super pixel including a quantity of individual pixels, and with these super pixels being printed in an interlaced pattern and utilizing overlapping swaths of a printhead.

Briefly, the presently preferred embodiment of the present invention utilizes existing printer hardware, wherein 28 nozzles are provided on a printhead for each of four color inks. These colors are yellow, cyan and magenta (the subtractive primary colors), and black. By printing a pixel location with either a primary color or with a combination of two of the primary colors (a "secondary" color), that pixel location may be caused to be one of six individual colors. Therefore, the total number of variations for each pixel location on a medium is eight, including black and white, with white being the result of leaving the pixel location unprinted. However, in accordance with the present invention, a group of pixel locations may be caused to include a variety of combinations of primary colors and/or secondary colors, or such combinations further including either black or white. Because human perception tends to integrate these groups of tiny overlapping pixels into what is perceived to be (at ordinary reading distance) a single homogeneous color or shading variation, a great variety of color or shading variations may be produced.

This ability to blend colors according to the present invention is best achieved when the number of pixels in each of these groups of pixels is greater than one and less than would result in an obvious loss of resolution in the printed image. In accordance with the presently preferred embodiment of the present invention, pixel locations are grouped into "super pixels" of four pixels each. However, the inventive method will also serve to eliminate unwanted ink migration and to reduce the banding problem when pixel locations are treated individually, and the described pattern and sequence for laying down "super pixels" is applied to individual pixel locations.

Since none of the super pixels is printed in the same transverse movement of the printhead as is any contiguous super pixel, problems of color bleeding between super pixels is eliminated. Further, since it is intended that each super pixel be perceived as being of a single homogeneous color, color bleeding within a super pixel is considered to be harmless.

The banding problem is eliminated by staggering printhead movements across the medium such that a first printhead movement across a swath prints all even numbered super pixel locations as required in a swath, the medium is then advanced by one-half swath distance, and the printhead then prints all odd numbered super pixel locations as required in the bottom half of a previous swath and in the top half of a next swath.

By this method, the resultant image is of a much higher quality than has been produced using prior art methods. The inventive method accomplishes this improvement in print quality without unduly complicating the task of providing computer programs for providing a multitude of colors, as once a system for implementing the method taught is included either in program software or in printer firmware, a program may call up a designated color combination for a super pixel by number. Without benefit of the inventive method, assigning colors to each individual pixel so as to effect the various color combinations available as a result of this method would be exceedingly complicated.

An advantage of the present invention is that visible banding is greatly reduced in a printed image.

Another advantage of the present invention is that unwanted bleeding between pixel locations is greatly reduced.

Yet another advantage of the present invention is that a great variety of color and shading variations may be produced in a printed image without losing the advantages of reduced color bleeding and reduced banding.

A further advantage of the present invention is that relatively simple programming may be used to implement the inventive method.

These and other advantages of the present invention will become clear to those skilled in the art in view of the description of the best presently known mode of carrying out the invention and the industrial applicability of the preferred embodiment as described herein and as illustrated in the several figures of the drawing.

BEST MODES FOR CARRYING OUT THE INVENTION

Figure 1:
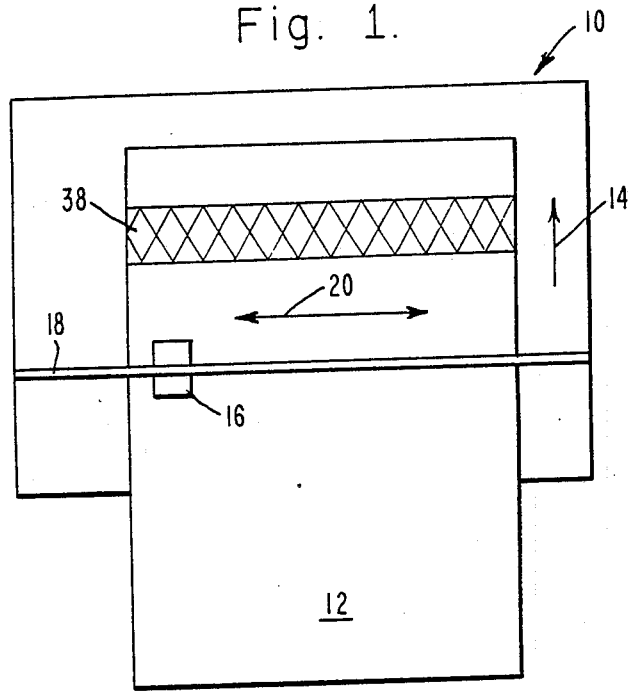
FIG. 1 is a diagrammatic representation of a printer suitable for use in performance of the inventive method.
Figure 6:
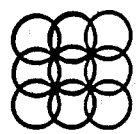
FIG. 6 shows the overlapping nature of adjacent ink dots on a medium.
Figure 7:
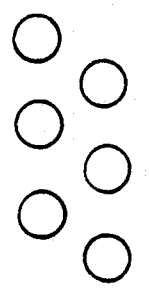
FIG. 7 shows the staggered nature of nozzles on a printhead.

The best presently known mode for carrying out the invention employs a conventional color ink-jet printer used in a manner so as to implement the inventive method. Referring to FIG. 1, the printer 10, shown here in a diagrammatic form, uses conventional means (not shown) for advancing a print medium 12 in a medium advance direction 14. A printhead 16 is affixed to a printhead sliding mechanism 18 for allowing the printhead to traverse across the medium 12 in a printhead traversing plane 20. The printhead 16 is caused to move upon the printhead sliding mechanism 18 by a printhead drive mechanism (not shown).

Figure 2:
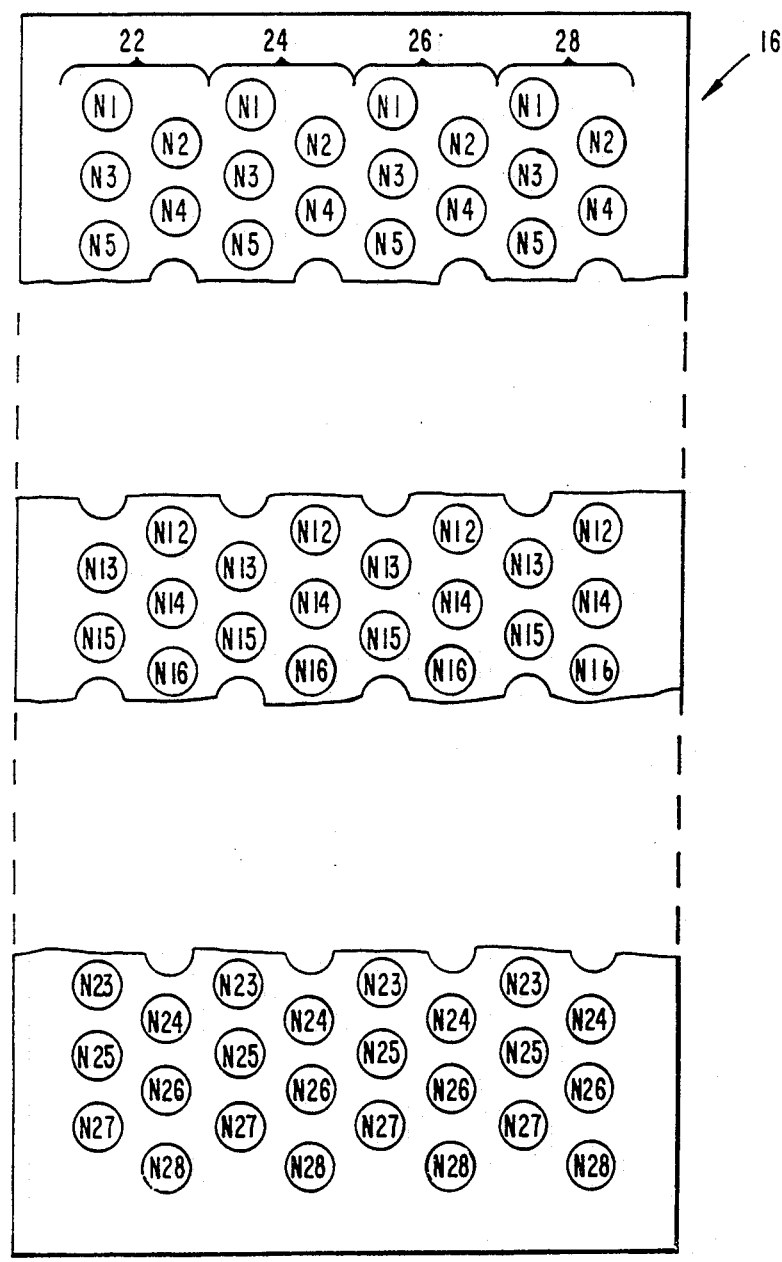
FIG. 2 is a representation of the face of the printhead as used in the best known embodiment of the invention, showing the arrangement of ink nozzles thereon.

Referring now to FIG. 2, there is shown a diagram of a printhead face 20 whereon are vertically arranged a group of nozzles for yellow ink 22, a group of nozzles for cyan ink 24, a group of nozzles for magenta ink 26, and a group of nozzles for black ink 28. Each of the nozzle groups 22, 24, 26, and 28 include twenty eight individual nozzles N1 through N28. The printhead 16 (FIG. 1) is positioned over the medium 12 such that the printhead face 20 is facingly opposed to the medium so as to effectuate printing thereon.

Complete solid area coverage of the medium 12 might be obtained by causing each of the vertically arranged nozzles N1 through N28 of each of the nozzle groups 22, 24, 26 and 28 to expel a droplet of ink, then causing the printhead 30 to advance horizontally 1/180 inch across the medium, then again causing each of the vertically arranged nozzles N1 through N28 of each of the nozzle groups to expel a droplet of ink, again causing the printhead to advance horizontally 1/180 inch, and repeating this process across the medium.

Figure 3:
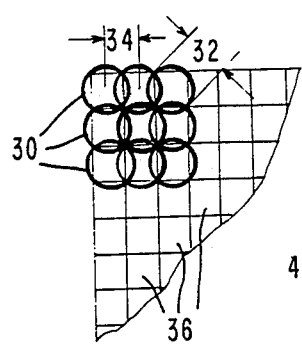
FIG. 3 depicts a part of a medium showing division into pixel areas, the placement of ink droplets thereon, and the size and placement relationships thereof.

Referring now to FIG. 3, the nozzles N1 through N28 (FIG. 2) are of a size such that an ink dot 30 ejected therefrom will be of an approximate diameter 32 of $2 \times (1/180)$ inch after impact with the medium 12. Since the center to center distance of the dots 34, according to the presently preferred embodiment of the invention as described above is 1/180 inch, this results in a coverage wherein dots 30 that are horizontally and vertically adjacent overlap, and dots that are diagonally adjacent just touch. Each location on the medium 12 where an ink dot 30 might be made is referred to as a pixel 36, whether or not an ink dot is actually deposited thereon.

Referring again to FIG. 1, after the printhead 16 has completely traversed the medium 12, the medium could then be caused to advance by 28/180 inch in the medium advance direction 14, the printhead 16 could then be returned to its initial position, and again the printhead could be caused to traverse the medium. The entire area of the medium 12 which might be inked in a single pass of the printhead 16 is referred to as a swath 38. By repeating these steps, every pixel 36 on the medium 12 could have deposited thereon four ink dots 30 (one each of yellow, cyan, magenta and black). Of course, in a practical application, only those pixels 36 directed under computer control to be inked would have ink dots 30 actually deposited thereon. A further practical limitation is that, normally, a maximum of two ink dots 30 per pixel 36 is desirable.

Figure 4:
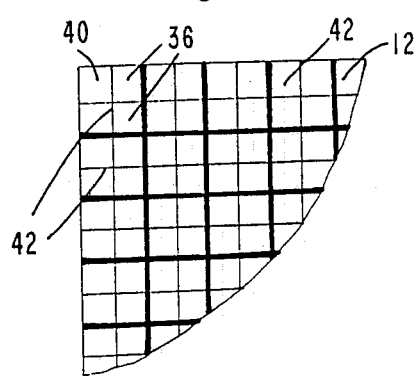
FIG. 4 depicts a part of a medium showing groupings of four pixels into "super pixels"
Figure 8:
FIG. 8 shows an example of a pattern of ink dots that might be produced by the nozzle of FIG. 7 under computer control.

Referring now to FIG. 4, according to the presently preferred embodiment of the inventive method, beginning at an extreme upper left pixel 40 on the medium 12, the extreme upper left pixel and the three pixels 36 immediately adjacent thereto are designated and defined as being a "super pixel" 42. In the same manner, each succeeding group of four pixels 38 on the entire medium 26 is designated and defined as being a super pixel 42. Each of the pixels 36 within a super pixel 42 may be caused to be one of eight colors (including white) by either not printing ink thereon (white), or by printing thereon, under computer control, either black ink, yellow ink, cyan ink, or magenta ink, or both yellow ink and cyan ink (green), both cyan ink and magenta ink (blue), or both yellow ink and magenta ink (red). Therefore, a total of 4096 permutations of color arrangements within a super pixel 42 is mathematically possible. However, according to the presently preferred embodiment of the present invention, many of these potential permutations are considered to be unnecessarily duplicative. Therefore, according to the method of the preferred embodiment of the present invention, all color combinations (three yellow and one black, for example) are always arranged in the same relative order, thus resulting in 330 variations of color and shading. Since human perception will, at normal reading distance, cause super pixels 42 of the size describe herein which are created according to the inventive method to appear to be of a single homogeneous color, 330 variations of coloring and shading is provided for each super pixel. This limitation of 330 variations of colors according to the presently preferred embodiment of the present invention is by no means a limitation of the invention, as the inventive method is equally applicable to any variety of combinations of colors and combinations of colors, and any number of pixels 40 per super pixel 42. Further, the number of pixels 40 per super pixel 42 may be reduced to one, and the inventive method may be practiced as herein described in relation to the best presently known method for practicing the invention, by applying the sequence described herein for printing super pixel locations to the printing of individual pixel locations.

The sequence of applying ink dots 30 to the super pixels 42 according to the present invention, in general, provides for the printing of all required ink dots to be deposited within any given super pixel in a single pass of the printhead 16. However, all ink dots 30 contained in super pixels 42 that are either horizontally or vertically adjacent to a concurrently printed super pixel will be printed on an alternate pass of the printhead 16, either immediately preceding or immediately following. Further, in order to minimize banding effect, the printing of swaths 38 is accomplished by a sequence comprising a first transverse movement of the printhead 16 across the swath wherein nozzles N15 through N28 are used to print one quarter of the pixels 36 of the swath, a second transverse movement of the printhead across the swath wherein all nozzles N1 through N28 are used to print one half of the pixels in the swath, and a third transverse movement of printhead across the swath wherein nozzles N1 through N14 are used to print one quarter of the pixels in the swath. During the third transverse movement of the printhead 16, nozzles N15 through N28 are used to concurrently print one quarter of the pixels 36 in the next succeeding swath 38, thus beginning this series again as to the next succeeding swath.

Figure 5C:
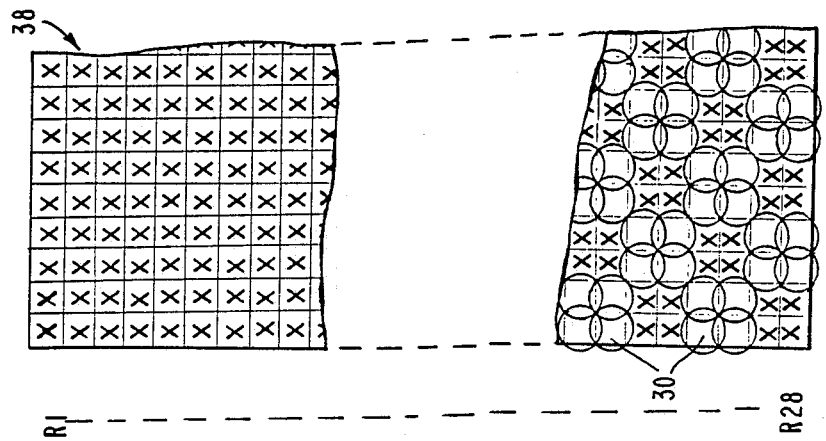
FIGS. 5($a$), 5($b$), and 5($c$) show a portion of a single swath of pixels and ink dots placed thereon in three successive passes of a printhead over the swath.
Figure 5B:
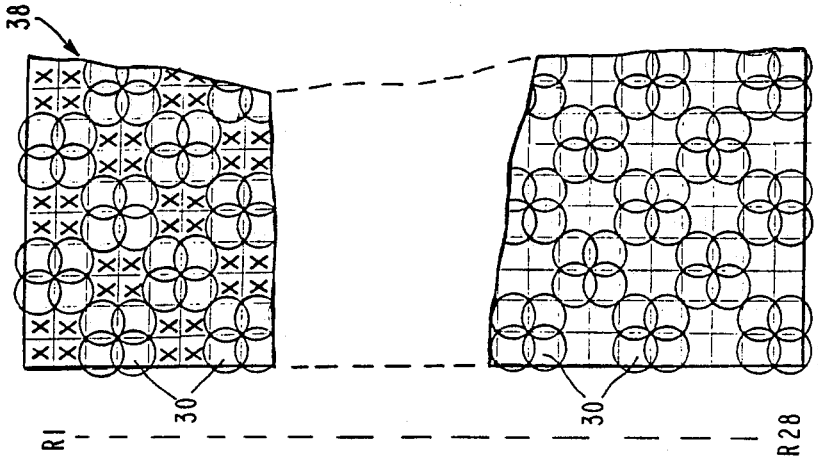
Figure 5A:
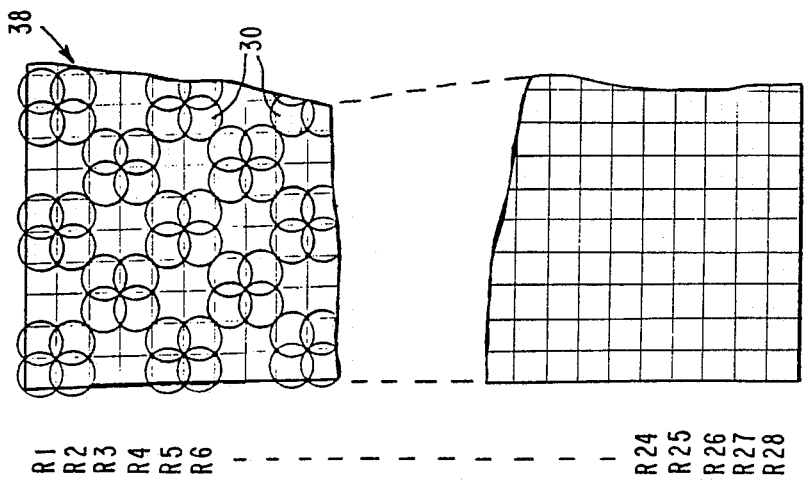

Referring now to FIG. 5, which depicts the sequence for printing ink dots 30 according to the presently preferred embodiment of the present invention, a portion of a single swath 38 is shown. FIG. 5(a) depicts the ink dots 30 that would be printed on a first pass of the printhead 16. In this figure, row designations R1 through R28 are a numbering system for the arrangement of pixel locations 36 within the swath 38. On a first pass across the illustrated swath 38, the ink dots 30 shown as printed in FIG. 5(a) in rows R1 through R14 would be printed by nozzles N15 through N28 (FIG. 2), respectively. The medium 12 is then advanced the length of 14 pixels (14/180 inch), and the printhead 16 would make a second pass across the medium 12. In the presently preferred embodiment of the present invention, the printhead 16 is returned to its original position after each pass, and each pass wherein printing occurs is, therefore, in the same direction as all other printing passes. However, this is desirable because of the specific arrangement of nozzles in this preferred embodiment, and because of other limitations of the printer 10 used to implement the inventive method. This is not a limitation of the inventive method, and printing in both directions of travel of the printhead 16 is entirely within the scope of this invention. On the second pass of the printhead 16 across the swath 38, alternate super pixels 42 are printed as shown in FIG. 5(b), wherein pixels that have been printed in the previous pass are designated by "x". On this second pass, pixels in rows R1 through R28 are printed by nozzles N1 through N28 (FIG. 2), respectively. The medium 12 is then again advanced the length of 14 pixels (14/180 inch), and the printhead 16 would make a third pass across the medium. On the third pass of the printhead 16 across the swath 38, the remainder of the super pixels 42 are printed as shown in FIG. 5(c), wherein pixels that have been printed on the previous two passes are designated by "x". On this third pass, pixels in rows R15 through R28 are printed by nozzles N1 through N14 (FIG. 2), respectively. Also on this third pass, nozzles N15 through N28 are used to begin a next consecutive swath (not shown).

As can be understood from the above description, according to the sequence just described, there will be a first pass of the printhead 16 across the medium 12 wherein nozzles N1 through N14 are not used, and a last pass of the printhead across the medium wherein nozzles N15 through N28 are not used. On all other passes of the printhead 16, all of the nozzles N1 through N28 are used, as needed to create a desired printed image under computer control. Accordingly, in order to print an entire image, a total of two passes of the printhead 16 is required per swath 38 which is to be printed on the medium 12, plus two additional passes (one at the top and one at the bottom).

Various modifications to the inventive method may be made without altering its value or scope. For instance, any number of nozzles might be employed. Another obvious modification would be to employ the inventive method in monochrome (black and white) applications wherein only various shadings, rather than variations of both shading and color, could be derived. Further, the individual pixels and ink dots of the inventive method could be of any size commensurate with the goal of having them perceived as a unit by the human eye. Further, the method could be adapted to use with types of printers other than ink-jet printers. Another conceivable variation of the inventive method would be to reduce the number of pixel locations per super pixel to one, thereby retaining the advantages of reduced color bleeding and reduced banding, such as for applications wherein multiple colors or shades are not desired.

All of the above are only some examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

As can be understood from the above description of the inventive method, an image is produced which is of very high quality since it is relatively free of unwanted ink bleeding and banding problems. This high quality image can be comprised of a great variety of combinations of colors and shadings. In the type of application for which the inventive method is best suited, the problems of color bleeding and banding are most harmful. Therefore, since both of these problems are effectively cured by the inventive method, the images produced by this method are of the highest quality practically attainable for this sort of printed image. As will be understood by those familiar with this field, bleeding between super pixels (or between individual pixels in applications wherein super pixels are not used) is essentially eliminated by the method described herein. Further, bleeding between pixels within a super pixel will not be at all harmful to image quality. In fact, some of this sort of bleeding might even help to blend the colors within the super pixel and would thus even add to image quality. The banding problem, while not eliminated, is very well masked by the overlapping nature of printhead passes.

Also important is the ease of producing multi-colored or multi-shaded images according to the present inventive method. Once a set of instructions for producing images according to the inventive method is introduced into either computer software or printer firmware, a programmer wishing to use the inventive method for producing an image from a program can easily "call up" any of the available color and shading variations available per super pixel. Without the inventive method, the task of programming such a variety of colors pixel by pixel would be greatly complicated.

For these and other reasons, it is expected that the utility and industrial applicability of the invention will be both significant in scope and long lasting in duration.

What is claimed is:

1. A process for using an ink-jet printer to produce high quality printed images on a plurality of pixel locations of a printing medium comprising a sequence for depositing an ink on the pixels of the medium, including:
    a first pass of a printhead across a first swath of the printing medium wherein alternate of the pixel locations are printed, as required to produce a desired image, such that those of the pixels which are horizontally and vertically adjacent are not printed on said first pass of the printhead, and such that only the alternate pixel locations in a top half of said first swath are printed on said first pass;
    a second pass of the printhead across said first swath wherein alternate of the pixel locations are printed, as required to produce a desired image, such that those of the pixel locations to be printed on the top half of said first swath which were not printed on said first pass of said printhead are printed on said second pass of said printhead, and wherein alternate of the pixel locations to be printed in a bottom half of said swath are printed such that those of the pixels which are horizontally and vertically adjacent are not printed on said second pass of said printhead;
    a third pass of the printhead across said first swath wherein alternate of the pixel locations are printed, as required to produce a desired image, such that the pixel locations to be printed in said first swath not printed on said first pass of said printhead or said second pass of said printhead are printed on said third pass of said printhead, and wherein a first pass on a next succeeding swath is accomplished simultaneously with said third pass of the printhead across said first swath; and
    a continuation of passes of said printhead across a plurality of succeeding swaths, repeating the requirements of said first pass, said second pass, and said third pass, until the entirety of said desired image is produced.

2. The process of claim 1, wherein:
    said printhead includes a plurality of nozzles for different colored inks: and
    said printed image is produced by application of the process of claim one with each of said pluralities of nozzles for different colored inks.

3. A process for producing multi-colored printed images on a printed medium, comprising the steps of:
    allocating a plurality of groups of contiguous pixel locations on the medium into a plurality of super pixels;
    furnishing a plurality of ink delivery nozzles for depositing a plurality of different colored inks on the pixels of said super pixels; and
    depositing said colored inks on the pixels of said super pixels in a plurality of combinations by a sequence including:
    making a first pass of a printhead across a swath wherein alternate of said super pixel locations are printed, as required to produce a desired image, such that those of said super pixels that are horizontally and vertically adjacent are not printed on said first pass of said printhead, and
    a second pass of said printhead across said swath wherein alternate of said super pixel locations are printed, as required to produce a desired image, such that said super pixel locations to be printed which were not printed on said first pass of said printhead are printed on said second pass of said printhead.

4. The process of claim 3, further comprising a sequence for depositing said colored inks on the pixels of said super pixels, including:
    a first pass of a printhead across a first swath wherein alternate of the super pixel locations are printed, as required to produce a desired image, such that those of the super pixels that are horizontally and vertically adjacent are not printed on said first pass of the printhead, and such that only said alternate super pixels locations to be printed in a top half of said first swath are printed on said first pass;
    a second pass of the printhead across the first swath wherein alternate of the super pixel locations are printed, as required to produce a desired image, such that the super pixel locations to be printed on the top half of said first swath which were not printed on said first pass of said printhead are printed on said second pass of said printhead, and wherein alternate of the super pixel locations to be printed in a bottom half of said swath are printed such those of the super pixels that are horizontally and vertically adjacent are not printed on said second pass of said printhead;

a third pass of the printhead across the first swath wherein alternate of the super pixel locations are printed, as required to produce a desired image, such that those of the super pixel locations to be printed in said first swath not printed on said first pass of said printhead or said second pass of said printhead are printed on said third pass of said printhead, and wherein a first pass on a next succeeding swath is accomplished simultaneously with said third pass of the printhead across said first swath; and a continuation of passes of said printhead across a plurality of succeeding swaths, repeating the requirements of said first pass, said second pass, and said third pass, until the entirely of said desired image is produced.

5. The process of claim 3, wherein the ink is deposited on the pixels of said super pixels by thermally ejecting droplets from the nozzles.

6. The process of claim 3, wherein the nozzles are mounted on a traversing mechanism that traverses across the printing medium parallel to its surface.

7. An improved method for producing a multi-colored printed image upon a print medium comprising a plurality of individual potential ink dot locations using an ink-jet device, said device including at least one printhead including a plurality of nozzles for ejecting colored inks onto the print medium, said method comprising:

(a) selecting a pattern of groups of said potential ink dot locations on the medium to be viewed as individual color combinations; and (b) depositing a combination of various colored inks into the individual potential ink dot locations of each of said groups of said potential ink dots locations, as required to produce said multi-colored printed image, wherein said printhead is advanced by one half swath between each of a plurality of successive passes of said printhead.

8. The method of claim 7, wherein horizontally and vertically adjacent of said groups of potential ink dot locations are printed in a successive pass of said printhead.

9. The method of claim 7, wherein said printhead is positioned over said print medium by moving said printhead with respect to said medium.

10. The method of claim 7, wherein said printhead is positioned over said print medium by moving said print medium with respect to said printhead.

11. The method of claim 7, wherein:

said colored inks are all of a same color, and the resultant multi-colored printed image is multi-colored by including a plurality of variations of shading of said same color.

12. The method claim 7, wherein:

said colored inks are all of a variety of colors, and the resultant multi-colored printed image is multi-colored by including a plurality of variations of shading of said variety of colors, as well as a plurality of variations of hues produced by various combinations of said variety of colors.

13. An improved method for producing a multi-shaded printed image upon a print medium comprising a plurality of individual potential ink dot locations using an ink-jet device, said device including at least one printhead including a plurality of nozzles for ejecting inks onto the print medium, said method comprising:

(a) selecting a pattern of groups of said potential ink dot locations on the medium to be viewed as individual shading combinations; and (b) depositing or refraining from depositing ink into the individual potential ink dot locations of each of said groups of said potential ink dots locations, as required to produce said multi-shaded printed image, wherein horizontally and vertically adjacent of said groups of potential ink dot locations are printed in a successive pass of said printhead.

14. The method of claim 13, wherein said printhead is advanced by a one half swath length between each of successive passes of said printhead.

15. The method of claim 13, wherein said printhead is positioned over said print medium by moving said printhead with respect to said medium.

16. The method of claim 13, wherein said printhead is positioned over said print medium by moving said print medium with respect to said printhead.

* * * * *